United States Patent
Covi et al.

(10) Patent No.: US 7,805,618 B2
(45) Date of Patent: Sep. 28, 2010

(54) COMPONENT INDICATORS USED DURING EXTENDED POWER-OFF SERVICE

(75) Inventors: Kevin R. Covi, Glenford, NY (US); Gerald J. Fahr, Wappingers Falls, NY (US); Raymond J. Harrington, Staatsburg, NY (US); Raymond A. Longhi, Poughkeepsie, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/357,147

(22) Filed: Feb. 17, 2006

(65) Prior Publication Data

US 2007/0220324 A1    Sep. 20, 2007

(51) Int. Cl.
*G06F 1/00* (2006.01)
*G06F 15/177* (2006.01)

(52) U.S. Cl. ..................... 713/300; 709/224
(58) Field of Classification Search ............ 713/300; 709/224; 707/205
See application file for complete search history.

(56) References Cited

U.S. PATENT DOCUMENTS

| | | | |
|---|---|---|---|
| 4,868,832 A * | 9/1989 | Marrington et al. ......... 714/22 |
| 5,402,008 A * | 3/1995 | St. John ..................... 307/64 |
| 5,519,832 A | 5/1996 | Warchol ............... 395/183.22 |
| 5,671,141 A * | 9/1997 | Smith et al. ................. 701/29 |
| 5,673,028 A | 9/1997 | Levy ........................ 340/635 |
| 5,909,480 A * | 6/1999 | Reynaud et al. ......... 379/15.01 |
| 6,356,057 B1 * | 3/2002 | Shilo et al. ................. 320/127 |
| 6,369,463 B1 * | 4/2002 | Maiorano .................... 307/66 |
| 6,758,573 B1 | 7/2004 | Thomas et al. ............ 362/133 |
| 7,274,975 B2 * | 9/2007 | Miller ....................... 700/295 |
| 2003/0087677 A1 * | 5/2003 | Miller et al. ................ 455/572 |
| 2003/0112119 A1 * | 6/2003 | Hom et al. ................... 340/5.2 |
| 2004/0177143 A1 * | 9/2004 | Maciel et al. ............. 709/224 |
| 2004/0189341 A1 | 9/2004 | Liu ............................ 324/771 |
| 2006/0143255 A1 * | 6/2006 | Shinohe et al. ............ 707/205 |
| 2007/0027981 A1 * | 2/2007 | Coglitore et al. ........... 709/224 |
| 2007/0037567 A1 * | 2/2007 | Ungless et al. .......... 455/422.1 |

\* cited by examiner

*Primary Examiner*—Vincent T Tran
(74) *Attorney, Agent, or Firm*—Geraldine Monteleone, Esq.; Kevin P. Radigan, Esq.; Heslin Rothenberg Farley & Mesiti P.C.

(57) ABSTRACT

A method and related apparatus for servicing an electrical/electronic device during power shut offs is provided. The apparatus comprises a service logic having a memory and control component for storing device information during normal device operation and one or more indicators driven by the memory and control component after power shut off to provide service signals. The service logic also includes an auxiliary energy source selectively engageable to provide auxiliary power to the memory and control component during power shut off and to enable providing of service signals through the indicator(s).

20 Claims, 3 Drawing Sheets

COMPONENT INDICATORS USED DURING EXTENDED POWER-OFF SERVICE

BACKGROUND OF THE INVENTION

1. Field of the Invention

This invention relates to a method and apparatus of servicing electrical and/or electronic components and more particularly to servicing electrical and/or electronic components in a computing system environment.

2. Description of Background

Electrical and electronic devices include many components that need servicing and replacement from time to time. One of the difficulties with providing such service is the process of determining which component(s) need replacement. To make matters worse, many such failures can cause a device or even an entire system environment shut down which in turn will make failure determination more difficult. This problem becomes even more complicated in environments that utilize many such devices and components where chance of failure is intensified.

One such situation where many devices and components are utilized in close proximity is a computing system environment. The larger the computing system environment, the more the chance of failure and/or need for servicing of the incorporated devices and components. Unfortunately, many times even a small failure can result in costly system performance problems and mulfunctions. The designers of such environments, have tried to incorporate redundancies and/or indicators that can aid in the determination of problems in such environments. Unfortunately, in most cases, however, even when an indicator is provided to pinpoint such problems during system operations, once main power is lost, the indicators provided by the system environment are no longer functional to signal the problems areas.

Losing service indicators in a power shut down is a serious problems in large computing system environments. This is because, in a large computing system environment, in order to service electrical hardware assemblies that include many such devices and components, it is often required to manually power off the specific hardware assembly in need of service, if not the entire system even when power shut down is not caused by the failure itself. In the situations discussed above, this usually results in the inability to identify the assembly, a particular component, or a specific location where the servicing needs to be performed. Determining the failed component quickly becomes difficult once the power is shut off which can lead to the significant problem of providing improperly performed service on the wrong assemblies, components, and locations.

One possible solution is to provide stored energy to power the logic hardware required to drive the indicators after the hardware assembly has been powered off. However, this approach usually limits the power off time in which the service procedure needs to be performed, since this service logic is constantly draining energy from the stored power source.

Consequently, a need exists for an apparatus and method for servicing electrical and electronic devices, such as those incorporated in a large computing environment, that can signal servicing needs even after a system shut down.

SUMMARY OF THE INVENTION

The shortcomings of the prior art are overcome and additional advantages are provided through the method and related apparatus for servicing an electrical/electronic device during power shut offs. The apparatus comprises a service logic having a memory and control component for storing device information during normal device operation and one or more indicators driven by the memory and control component after power shut off to provide service signals. The service logic also includes an auxiliary energy source selectively engageable to provide auxiliary power to the memory and control component during power shut off and to enable providing of service signals through the indicator(s).

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
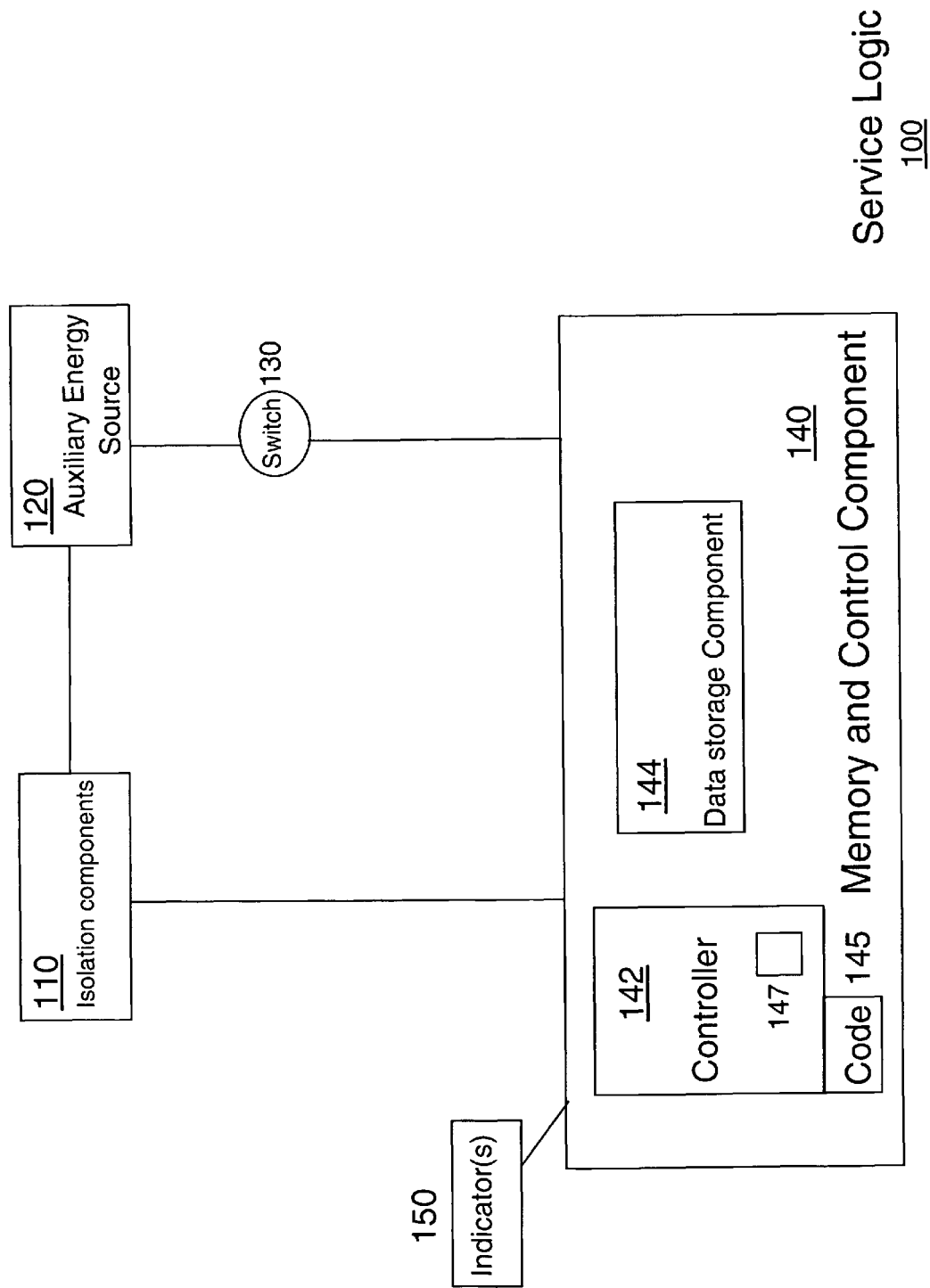
FIG. 1 is a cross sectional illustration of one embodiment of the present invention.

FIG. 1 is a schematic illustration of a service logic 100 as per one embodiment of the present invention. The service logic 100 as will be discussed later in greater detail, is designed to allow signaling of servicing needs of electrical and electronic components, such as those incorporated in a computing system environment, even after a system shut down. It should be noted, that although for ease of reference and understanding the workings of the present invention is discussed in conjunction with a computing system environment in the following discussion, its use is not limited to such systems environments. In fact, the present invention can be used with an in conjunction with any electrical or electronic system and device.

Service Logic 100, such as the one illustrated in FIG. 1 is capable of being electronically or electrically connected to a device or system environment that is to be subsequently serviced. Throughout the following discussion, references will be made to electrical connections and communications. It should be noted, that this is only for ease of reference and electrical connections and/or communications can be substituted by electronic connections and communications.

As illustrated in FIG. 1, the service logic 100 is comprised of a memory and control component 140 in electrical connection with isolation components 110. Electrical connection between memory and control component 140 and an auxiliary energy source 120 can also be established in a variety of ways, such as via a switch as illustrated in the example of FIG. 1 and referenced by numerals 130. In other words, auxiliary energy source 120 can be isolated or engageably connected to provide alternate energy to the memory and control component 140.

It should be noted that while in the embodiment of FIG. 1, a switch is provided, other similar substitutions as known to those skilled in the art to establish and disconnect the circuitry to the auxiliary energy source can be used. In one embodiment, as shown, the switch is an electromechanical switch such as a simple push button switch that electrically engages the auxiliary energy source 120 when closed, but is normally left in open position during normal device or system operation. As known to those skilled in the art, however, other similar means are also available.

The auxiliary energy source 120 can be a simple source or a sophisticated one. In some embodiments of the present invention, a plurality of such sources can also be combined together to form a unitary auxiliary energy source. Examples can range from capacitors to batteries and other similar devices as known to those skilled in the art.

The auxiliary energy source 120 is also independently connected to isolation components 110 as shown. The isolation components are designed to prevent depletion of auxiliary energy source during a power off condition. In many prior art devices and systems, when the system power was shut, any energy provided is quickly depleted. In the present invention, the isolation components can vary and selectively designed to overcome this obstacle. As stated, depending on the device and system environment used, a variety of components and circuitry can be designed as known to those skilled in the art. One example would be the use of one or more field effect transistors (FETs) alone or in conjunction with one another or other circuitry.

The memory and control component 140 can include or in turn be in electrical communication with one or more indicators that can be used to indicate servicing needs. The indicator(s) can be part of the memory and control component 140 or reside outside it as shown in FIG. 1. The indicator(s) are referenced in general by numerals 150. The indicator(s) are in electrical communication with the memory and control component and is driven by it as will be discussed in more detail below. The indicators can signal servicing signal depending on their type. In one embodiment, for example, the indicators can be driven by voltage changes to alternate from one state to another to indicate such servicing signals.

A variety of indicators can be used as known to those skilled in the art. A preferred indicator that can easily be detected and simply incorporated into the design of many circuits is a light emitting diode (LED). An LED can be turned on or off selectively to indicate servicing needs. Another advantage of an LED can be that it becomes an easy to detect indicator in situations where the environment may be dark due to the power shut off.

Depending on the type of the indicator, different varieties within each type of indicators may even be utilized to signify different messages. In the case of an LED, different color LEDs can be incorporated into the design to distinguish and ultimately signal different servicing needs. For example, a red LED may be utilized to signify a failing part as opposed to a blue one that can simply signal a missing but non integral part. As stated, these are only used as way of example and one or a plurality of indicators, of same or different kinds can be used to signify the message that needs to be relayed.

The memory and control component 140 comprise of two components that are in electrical communication with one another. These two components, as illustrated in FIG. 1, are a controller referenced as 142 and a data storage component referenced as 144.

It should be noted that in the preferred embodiment of FIG. 1, the controller 142 and data storage component 144 are shown in a unitary box that defines memory and control component 140. In alternate embodiments, it is possible to provide these components separately.

The data storage component 144 is designed for storing of information during normal device or system operation and also for subsequent retrieval of information when power is shut down. In a preferred embodiment, the data storage component 144, as illustrated, is a nonvolatile data storage component. A variety of devices are capable to perform this task as known to those skilled in the art. Some examples that can be provided for ease of understanding, are flash memory devices and serial EEPROMs. However, theses and other examples used in the present invention should be in no way limiting as there are many other electronic devices and components available that can be substituted based on the particular needs of the particular device and/or the environment that is to be serviced.

Similarly, as known to those skilled in the art, there are many electronic devices and components that can be used to perform the task of the controller 142, as discussed. One example would be a microprocessor or an FPGA device.

In one embodiment of the present invention, the memory and control component 140 includes non volatile code 145 designed to be utilized by the controller 142 specifically. The code 145 can be stored either internally or externally to the controller 142. In one embodiment, the code is executed whenever the controller is powered on.

In the embodiment illustrated in FIG. 1, the code 145 is shown to be stored internally. It should also be noted, that the code can be simple or sophisticated. Many features or only a few features can be added to it selectively to address the needs of a particular device or environment. In one embodiment of the present invention, however, the code 145 is designed so once executed by the controller, the controller can both drive the state of the indicator(s) and initiate information storage and retrieval into and from data storage component 142 as needed.

Once powered on, the controller 142 can also distinguish the mode of operation and performs certain tasks based on detection of either normal operating mode or servicing mode. This determination can be made based on a variety of factors. A simple way to determine modes of operation is provided in the examples shown in FIG. 1. A simple voltage driven input pin 147 is set and reset to indicate mode of operation as shown.

The cross sectional illustration of FIG. 1 is mostly to provide understanding of the service logic as provided by the present invention. As discussed above, many combinations, using a variety of simple or sophisticated components can be used to incorporate the teachings of the present invention. To provide better understanding, one such example is provided in FIG. 2 with the understanding that FIG. 2 is only one of many such possible embodiments and many other embodiments and combinations can be provided based on the teachings of the present invention.

Figure 2:
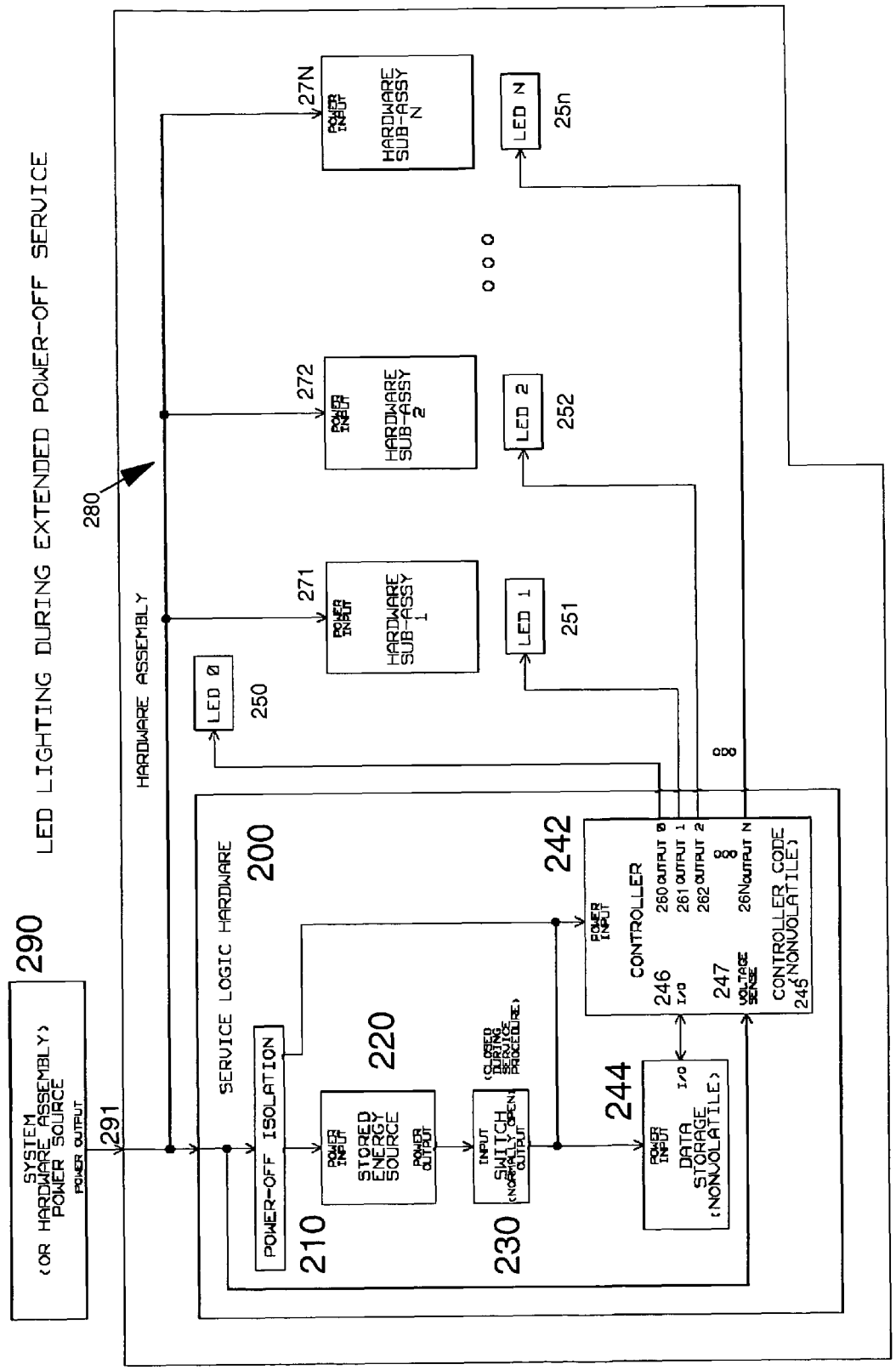
FIG. 2 is schematic illustration providing a more detailed example of the embodiment of FIG. 1.

FIG. 2 is a schematic illustration of an example based on embodiment of FIG. 1, but particularly designed to be used in conjunction with a system or hardware assembly such as the ones utilized in a computing system environment.

As illustrated in FIG. 2, power output line 291 provide power from a power source 290 into the system or hardware assembly including the service logic hardware 200. The power is then delivered to power isolation components 210, which as in FIG. 1, is in electrical communication with both the memory and control component and the auxiliary energy source 220. The auxiliary energy source 220, also referred to as the stored energy source in FIG. 2, is shown to include power input and power output lines.

The stored or auxiliary energy source 220 is normally isolated but engageable, such as via a switch 230 in a preferred embodiment, so as to establish electrical connection with the memory and control component. In FIG. 2, energy is supplied to the controller 242 and data storage 244 and electrical connection is established when the switch, that is normally open during normal device operation, is closed.

As discussed, the memory and control component 140 of FIG. 1 can be provided as independent components as illustrated in FIG. 2 instead of a unitary entity. These two components, as shown, are the (non-volatile) data storage component referenced herein as 244 and the controller referenced herein as 242. Both the data storage component 244 and the controller 242, as illustrated, are in electrical communication with one another and also with the power off isolation components 210. Through the operation of the switch 230, the controller 242 and the data storage component 244 are also placed in electrical communication with the stored or auxiliary energy source 220 as discussed.

Input-output (I/O) connections and a voltage sensor referenced respectively by numerals 246 and 247 are also provided as part of the controller 242 design. The controller 242 includes non-volatile controller code which in this example is internal to it and referenced as 245. This code 245 is designed so when executed, the controller 242 will drive a plurality of LEDs 250, 251, 252, ... 25N, which in this case that are used as service indicators. The output lines of the controller referenced as 260, 261, 262, ... 26N are each electrically connected to their respective indicator or LED pins so that the controller 242 can successfully drive the operation of these indicators through code execution at any appropriate time.

Since the components of the service logic 200 are now discussed, attention needs to be turned to the overall operation of these components in relation to one another. The service logic (100/200) is powered-on during normal system operation, but is electrically isolated during power-off. The auxiliary energy source (120/220) charges to its maximum capacity during normal operation, while the controller (142/242) initially clears any stored indicator/LED information. The controller then subsequently lights any appropriate LEDs, during normal operation, and stores that information in the nonvolatile data storage component 144/244 as well as well for subsequent use after a system shut down or powering off of the device.

Following a powering off or shut down, the service logic (100/200) sits dormant drawing no energy until the auxiliary energy source (120/220) becomes engaged (such as via the service switch 130/230) during a service procedure. This allows the establishment of electrical connections between the auxiliary energy source (120/220) and data storage component (144/244) and controller (142/242). Thereafter, the controller (142/242), operating from its nonvolatile stored code (145/245) and powered from the auxiliary (stored) energy source (110/210), determines that it is in service mode by monitoring the status of the input pin (147/247) for the presence of system voltage. Thereafter, it retrieves the indicator (i.e. LED) information which it had previously stored in the data storage component 144/244 and drives the indicators. In the case of the example provided by FIG. 2 that means that it drives the required outputs 260-26N necessary to light the appropriate LEDs 250-25N.

The auxiliary energy source (120/220) can then be disengaged such as by opening and closing a switch to conserve energy or to again highlight the required indicator or to light the LED as many times as needed. This process of opening and closing the switch (130/230), or rather engaging and disengaging the auxiliary energy source (120/220) can be repeated until the stored energy is depleted.

To better simplify some of the steps of the process as discussed above, a flowchart depiction may be helpful to ease better understanding of some of these process steps of service logic operation.

Figure 3:
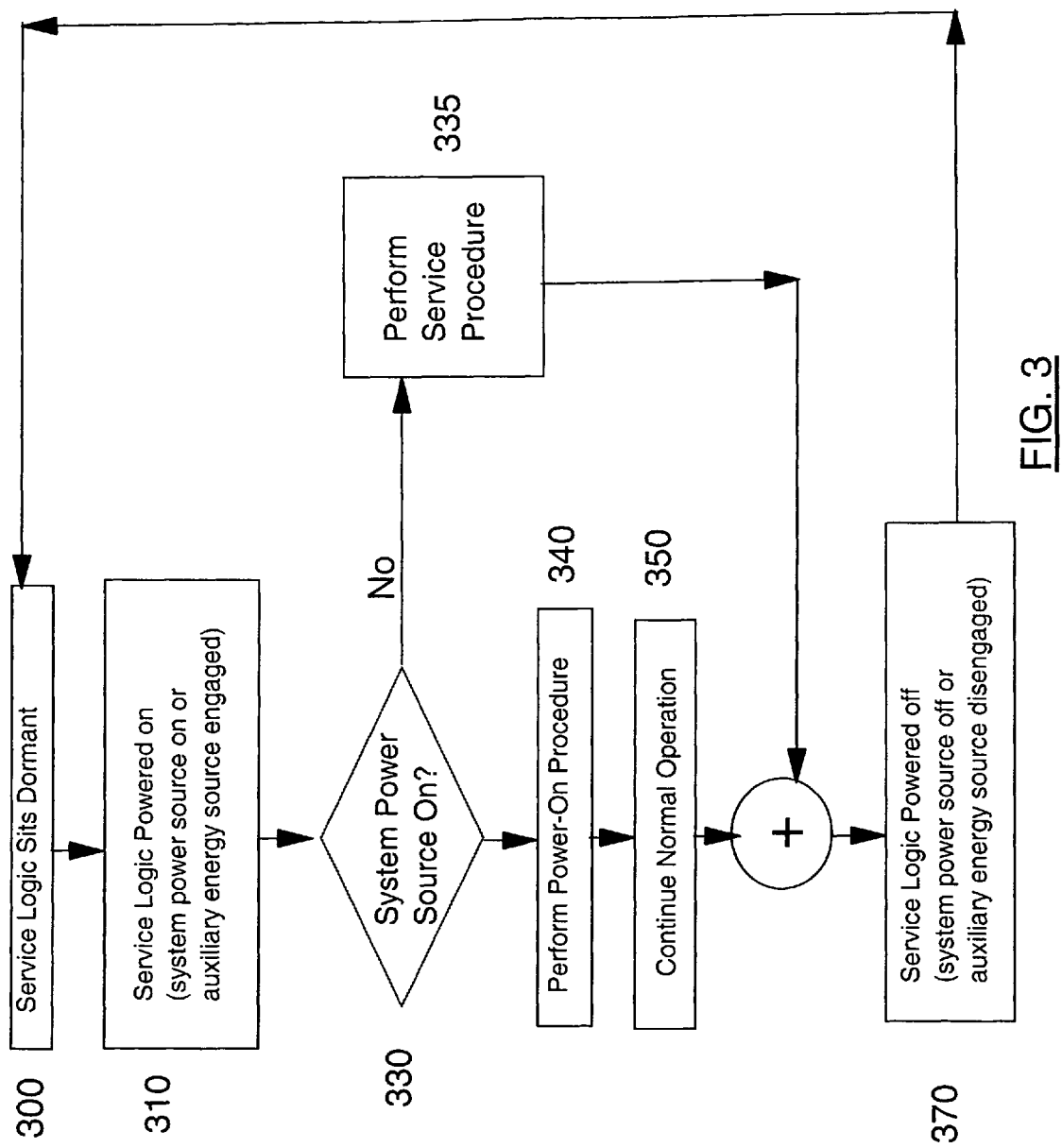
FIG. 3 is a flow chart illustration of an embodiment of the present invention.

FIG. 3 provides such a flowchart depiction which provides one embodiment of the present invention. FIG. 3 can be understood by reviewing it in conjunction with the schematic diagrams provided by FIG. 1 and FIG. 2 and the operational discussions provided above.

As illustrated in the flow chart diagram of FIG. 3, the service logic sits dormant as long as there is no power supplied to it, as referenced by block 300. The service logic can then be powered on as shown at 310, either by engaging the auxiliary energy source or through commencement of normal device operation. In FIG. 3, an example normal device operation commences by power supplied by the system power source, but other similar arrangements are possible depending on the particular device and the particular environment.

Service logic then determines the mode of operation, as shown in decision block referenced as 330. This determination can be made by a variety of means as discussed earlier, such as the setting and resetting of a voltage driven input pin.

If the service logic determines that normal operation is in progress, then a power on procedure is performed as depicted by reference block 340. This power-on procedure can include a variety of tasks. For example, during the normal power on process the auxiliary energy source is charged to the maximum. In addition, the controller clears all stored information relating to the indicators (i.e. LEDs). Other relevant information is also cleared from the data storage component. Thereafter, new relevant information can be stored in its place in the data storage component to be later used during subsequently instigated service procedure.

Normal device operation then continues, as shown by reference block 350, upon completion of power-on procedure. Normal operation continues until the service logic is powered off once again as illustrated at 370. The process can then repeat itself as illustrated by the loop shown between decision block 370 and decision block 300.

Referring back to decision block 330, if the service logic determines that service mode of operation is in effect. It initiates performance of a service procedure as illustrated by block 335. The service procedure can include a variety of procedural steps such as retrieval of pertinent and previously stored information and the driving of appropriate service indicators. Since the operation of service mode is dependent on energy supplied by the engagement of auxiliary energy source, such as by turning of a switch, this process can repeat itself to conserve energy or for other reasons until the auxiliary energy source is depleted. This is shown by the loop between decision blocks 370 and 300.

In this way, by providing logic hardware to both store and retrieve location of nonvolatile memory of the appropriate indicators (or LEDs which must be lighted) during the service procedure, along with the capability to drive them, and by utilizing a switch-enabled stored power boundary for this logic, the aforementioned service can be performed a long time after the electrical hardware assembly has been powered off. Since all of this service logic is not powered off until after the switch is closed, the stored energy does not start to be depleted once the hardware assembly to be serviced is powered-off. This allows the service to be performed without being constrained to a power-off time limit, thereby also providing a better chance that the service is performed correctly. In closing, it should also be noted that while the service logic is most often used to identify faulty components, the teachings of the present invention can be applicable to other servicing needs. Some examples may include detection and/or signaling of missing parts (integral or non-integral to system operations), incorrect installation of parts, and even installation of incorrect components to name a few.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for servicing an electrical/electronic device during power shut downs, comprising:
   a self contained service logic having a memory and control component for storing device information during normal device operation, said memory and control component storing data related to at least one failure of said device, the data being selectively retrieved after said device and said service logic are powered down;
   a switch for transitioning said service logic from a non-enabled state to an enabled state during a power shut down such that said service logic can enable one or more indicators driven by said data obtained from said data storage component of said memory and control component to indicate state of said device prior to shut down and failures potentially causing said shut down;
   said service logic also having a selectively-engageable auxiliary energy source that is charged during normal device operation and provides selective, temporary powering of said service logic when said service logic is transitioned by the switch from non-enabled state to enabled state during power shut down of said device; and
   at least one power isolation component in electrical communication with said memory and control component and said auxiliary energy source to prevent powering of said device by said auxiliary energy source during power shut down of said device, said auxiliary energy source being contained as part of a single self contained unit as said service logic, wherein when said selectively-engageable auxiliary energy source is engaged during a power shut down of said device power is selectively provided to said service logic during said power shut down of said device for enabling the one or more indicators driven by said data for diagnostic analysis of said device during shut down of said device.

2. The apparatus of claim 1, wherein said memory and control component and said auxiliary energy source are independently in electrical communication to said isolation component(s).

3. The apparatus of claim 2, wherein said auxiliary energy source is engageable via same or a different switch.

4. The apparatus of claim 3, wherein said memory and control component is further comprised of a controller and a data storage component.

5. The apparatus of claim 4, wherein said controller, once powered on, can determine mode of operation.

6. The apparatus of claim 5, wherein said controller has a voltage driven input for determining if said service logic is in service mode.

7. The apparatus of claim 6, wherein said voltage driven input is one or more input pin(s).

8. The apparatus of claim 1 wherein said indicator(s) are driven by said memory and controller device to alternate from one state to another to indicate servicing signals.

9. The apparatus of claim 8, wherein said memory and control component includes a non-volatile controller code executable by said controller to drive said indicator(s) from one state to another and to retrieve and store data from and into said storage component.

10. The apparatus of claim 9, wherein said controller code is stored internally in said controller.

11. The apparatus of claim 9, wherein said controller code is stored external to said controller.

12. The apparatus of claim 11, wherein said controller has one or more output lines that are in electrical communication with said indicator(s) and said indicator(s) are driven by execution of said code via said output lines.

13. The apparatus of a claim 11, wherein said indicator(s) are light emitting diode(s) or LEDs.

14. The apparatus of claim 11, wherein more than one indicator is used to display different servicing needs.

15. The apparatus of claim 13, wherein more than one LED is used to display different servicing needs.

16. The apparatus of claim 15, wherein said LEDs are provided in different colors with each color representing a different service condition.

17. The apparatus of claim 1, wherein said electrical and electronic device is part of a computing system environment, and said selectively-engageable auxiliary energy source allows repeated coupling and decoupling of said auxiliary energy source to said service logic during power shut down of said device as required for diagnostic analysis of said device using said service logic.

18. The apparatus of claim 17, wherein power is also provided to said memory and control component independently during normal operation by said computing system environment.

19. A system comprising:
   an electronic device;
   a self contained service logic having a memory and control component for storing device information during normal device operation, and one or more indicators driven by said memory and control component when said electronic device and said service logic are powered off to selectively provide service signals;
   a switch engageable to transition said service logic from a non-enabled state to an enabled state during power shut down of said electronic device for said memory and control component to drive the one or more indicators when said electronic device is powered off, thereby selectively enabling display of service signals through said indicator(s);
   a selectively-engageable auxiliary energy source to provide selective, temporary auxiliary power to said service logic when said service logic is transitioned by the switch from non-enabled state to enabled state during power shut down of said electronic device; and
   at least one power isolation component in electrical connection with said service logic to prevent the flow of said auxiliary power from said selectively-engageable auxiliary energy source to said powered off electronic device while selectively providing power to said service logic for enabling the one or more indicators for diagnostic analysis of said electronic device while said electronic device is powered off.

20. A method of servicing a large computer in a computing environment comprising:
   storing, during normal operation of the computer, relevant information relating to any failures of the operation of said computer in a self contained service logic having a memory and control component;
   subsequent to power shut down of the computer and transitioning of the self-contained service logic from an enabled state to a non-enabled state, engaging a switch during said power shut down of said computer to transition said service logic from non-enabled state to enabled state for enabling one or more indicators driven by said information stored in said service logic to immediately indicate the state of said computer prior to power shut down, and possible reason for failure, without providing power to said computer, wherein said engaging of said switch provides power to said service logic via a selectively-engageable auxiliary energy source that is charged via the computer during normal operation, and wherein the selectively-engageable auxiliary energy source and the memory and control component are in electrical communication with at least one power isolation component to prevent powering of said computer by said auxiliary energy source during power shut down of said computer, and wherein the selectively-engageable auxiliary energy source provides selective, temporary powering of said service logic when said service logic is transitioned by the switch from the non-enabled state to the enabled state during power shut down of the computer.

* * * * *